(12) United States Patent
Panigrahy et al.

(10) Patent No.: US 8,719,211 B2
(45) Date of Patent: May 6, 2014

(54) ESTIMATING RELATEDNESS IN SOCIAL NETWORK

(75) Inventors: Rina Panigrahy, San Ramon, CA (US); Mikhail Kapralov, Stanford, CA (US)

(73) Assignee: Microsoft Corporation, Redmond, WA (US)

( * ) Notice: Subject to any disclaimer, the term of this patent is extended or adjusted under 35 U.S.C. 154(b) by 548 days.

(21) Appl. No.: 13/018,424

(22) Filed: Feb. 1, 2011

(65) Prior Publication Data

US 2012/0197834 A1  Aug. 2, 2012

(51) Int. Cl.
*G06F 9/44* (2006.01)
*G06F 15/18* (2006.01)
*G06N 5/04* (2006.01)

(52) U.S. Cl.
CPC ........................ *G06N 5/048* (2013.01)
USPC ................ 706/52; 706/12; 706/14; 706/18; 706/21; 706/26

(58) Field of Classification Search
USPC ........................................... 706/12
See application file for complete search history.

(56) References Cited

U.S. PATENT DOCUMENTS

| | | | |
|---|---|---|---|
| 7,016,307 | B2 | 3/2006 | Vasudev et al. |
| 7,509,299 | B2 | 3/2009 | Liu et al. |
| 7,672,919 | B2 | 3/2010 | Becker |
| 7,689,682 | B1 | 3/2010 | Eldering et al. |
| 2005/0243736 | A1 | 11/2005 | Faloutsos et al. |
| 2006/0190225 | A1 | 8/2006 | Brand |

OTHER PUBLICATIONS

X. Wan and J. Yang. Multi-document Summarization Using Cluster-based Link Analysis. In Proc. of the 31st Annual International ACM SIGIR Conf. on Research and Development in Info Retrieval, [online], 2008 [retrieved on Apr. 7, 2013]. Retrieved from the Internet<URL:http://tangra.si.umich.edu/~radev/767w10/papers/Week08/Summarization/p299-wan.pdf>.*

Kesten, et al., "Random walks with occasionally modified transition probabilities", Retrieved at << http://arxiv.org/PS_cache/arxiv/pdf/0911/0911.3886v1.pdf >>, 2009, pp. 1-32.

Borodin, et al., "Finding Authorities and Hubs from Link Structures on the World Wide Web", Retrieved at << http://www10.org/cdrom/papers/pdf/p314.pdf >>, Hypermedia Track of the 10th International World Wide Web Conference, May 1-5, 2001, pp. 415-429.

Baswana, Surender, "Streaming Algorithm for Graph Spanners—Single Pass and Constant Processing Time per Edge", Retrieved at << http://www.cse.iitk.ac.in/users/sbaswana/Papers-published/stream-spanner.pdf/ >>, Information Processing Letters, vol. 106, No. 3, 2008, pp. 1-6.

(Continued)

*Primary Examiner* — Alan Chen
*Assistant Examiner* — Nathan Brown, Jr.
(74) *Attorney, Agent, or Firm* — Micah Goldsmith; Glen Johnson; Micky Minhas

(57) ABSTRACT

To facilitate the estimation of relatedness between nodes of a graph, implementations estimate relatedness between nodes in a graph by pre-computing for a subset of sample nodes (e.g., center nodes) a plurality of transition probabilities between each sample node and each of the other nodes in the graph, and then later when queried the implementations calculate in real-time the resultant estimated transition probability between the first node and the second node through the at least one sample node based on the pre-computed transition probabilities.

20 Claims, 4 Drawing Sheets

(56) References Cited

OTHER PUBLICATIONS

Baswana, et al., "A Simple Linear Time Algorithm for Computing Sparse Spanners in Weighted Graphs", Retrieved at http://citeseerx.ist.psu.edu/viewdoc/download;jsessionid=098F3ED2345C287040 57D7F4133769F9?doi=10.1.1.133.5323&rep=rep1&type=pdf >>, Automata, Languages and Programming, 30th International Colloquium, ICALP, Jun. 30-Jul. 4, 2003, pp. 1-20.

Cohan, Edith, "Fast Algorithms for Constructing t-Spanners and Paths with Stretch t", Retrieved at << http://ieeexplore.ieee.org/stamp/stamp.jsp?tp=&arnumber=366822 >>, Proceedings 34th Annual Symposium on Foundations of Computer Science, Nov. 3-5, 1993, pp. 648-658.

Sarma, et al., "A Sketch-Based Distance Oracle for Web-Scale Graphs", Retrieved at << http://www.wsdm-conference.org/2010/proceedings/docs/p401.pdf >>, Third ACM International Conference on Web Search and Data Mining, Feb. 3-6, 2010, pp. 401-410.

Dor, et al., "All Pairs Almost Shortest Paths", Retrieved at << http://ieeexplore.ieee.org/stamp/stamp.jsp?tp=&arnumber=548504 >>, SIAM Journal on Computing, vol. 29, No. 5, Mar. 2000, pp. 452-461.

Feigenbaum, et al., "Graph Distances in the Streaming Model: The Value of Space", Retrieved at << http://citeseerx.ist.psu.edu/viewdoc/download?doi=10.1.1.106.2568&rep=rep1&type=pdf >>, Proceedings of the Sixteenth Annual ACM-SIAM Symposium on Discrete Algorithms, SODA, Jan. 23-25, 2005, pp. 10.

Fouss, et al., "Random-Walk Computation of Similarities between Nodes of a Graph with Application to Collaborative Recommendation", Retrieved at << http://citeseerx.ist.psu.edu/viewdoc/download?doi=10.1.1.72.5404&rep=rep1&type=pdf >>, IEEE Transactions on Knowledge and Data Engineering, vol. 19, No. 3, Mar. 2007, pp. 355-369.

Patrascu, et al., "Distance Oracles beyond the Thorup-Zwick Bound", Retrieved at << http://people.csail.mit.edu/mip/papers/balls/paper.pdf >>, 51st Annual IEEE Symposium on Foundations of Computer Science (FOCS), Oct. 23-26, 2010, pp. 1-9.

Spielman, et al., "Graph Sparsification by Effective Resistances", Retrieved at << http://arxiv.org/PS_cache/arxiv/pdf/0803/0803.0929v3.pdf >>, Symposium on Theory of Computing Conference, May 17-20, 2008, pp. 1-13.

Thorup, et al., "Approximate Distance Oracles", Retrieved at << http://citeseerx.ist.psu.edu/viewdoc/download?doi=10.1.1.6.4034&rep=rep1&type=pdf >>, 33rd ACM Symposium on Theory of Computing, Jul. 6-8, 2001, pp. 10.

Thorup, et al., "Spanners and Emulators with Sublinear Distance Errors", Retrieved at << http://www.eecs.umich.edu/~pettie/theoryseminar/papers/Thorup-Zwick-sublinear-additive-error.pdf >>, Proceedings of the Seventeenth Annual ACM-SIAM Symposium on Discrete Algorithms, SODA, Jan. 22-26, 2006, pp. 802-809.

Woodruff, David P., "Lower Bounds for Additive Spanners, Emulators and More", Retrieved at >> http://citeseerx.ist.psu.edu/viewdoc/download?doi=10.1.1.140.5530&rep=rep1&type=pdf >>, 47th Annual IEEE Symposium on Foundations of Computer Science, Oct. 2006, pp. 10.

* cited by examiner

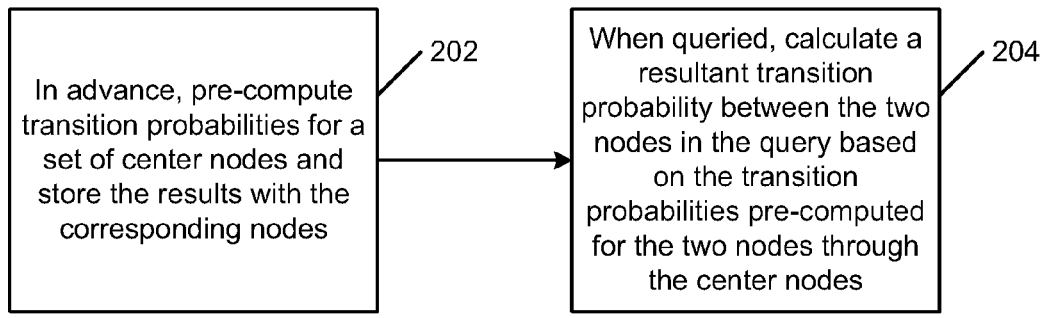
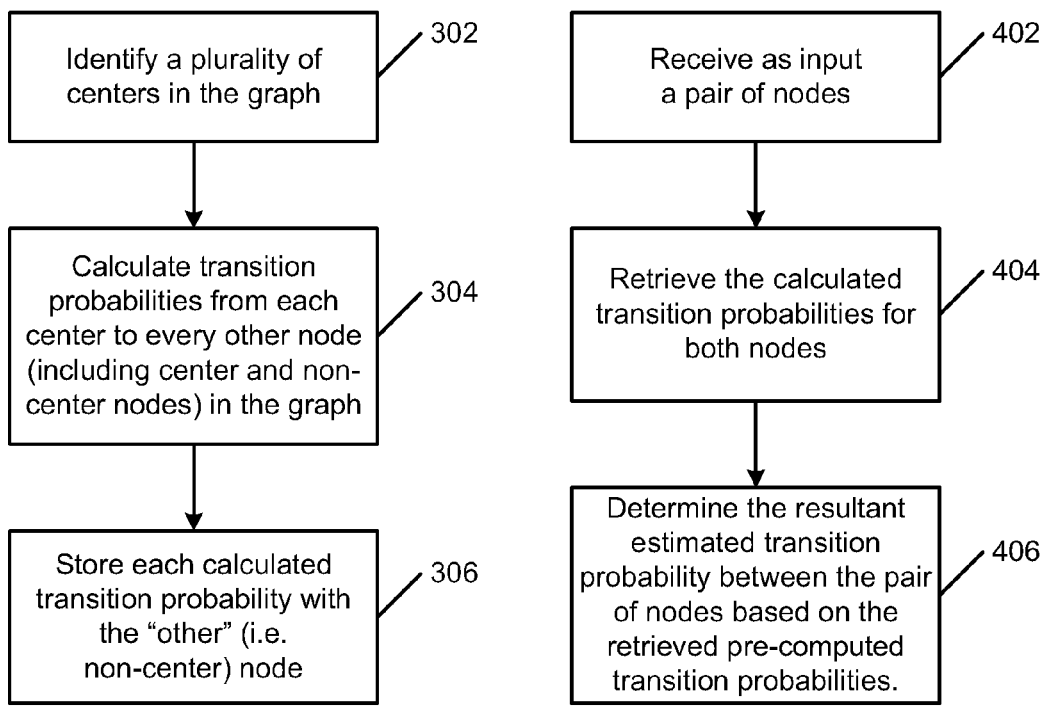

500

ESTIMATING RELATEDNESS IN SOCIAL NETWORK

BACKGROUND

Graphs are useful for modeling many real world systems such as highway systems, telephone networks, and the World Wide Web. For example, a graph representing a highway system might be used to determine the shortest distance between an origin and a planned destination. A graph may also be used to represent the relationships between Internet web pages where nodes represent individual web pages and edges represent links between web pages. In general, graphs typically comprise multiple nodes or vertices connected to one another by one or more edges. Such graphs may be directed or undirected, and there may be a weight, a length/distance, or a cost associated with one or more edges.

In modeling real world abstractions, graphs can be used to measure the relatedness between two nodes. Depending on the model, the relatedness can be measured several different ways. One measure of relatedness may be the shortest path distance between two nodes in the graph. Another measure of relatedness may be the number of paths (presumably of a certain length) between a pair of nodes. However, as the number of nodes and edges in a graph grows, the average time and computing resources needed to calculate the relatedness between two nodes can become enormous and become problematic when computational resources are limited and/or near-instantaneous or real-time results are desirable or expected.

Social networks are one instance of a real world abstraction that can be readily modeled with a very large graph. In such a model, people in the social network can be represented as a set of nodes and relationships can be represented as the edges between the nodes. In some implementation, each edge may be weighted to reflect the degree of direct relatedness between each node, while the sum of weights of intervening edges can be used to reflect the degree of indirect relatedness between any two nodes not directly connected. However, with the immense size of Internet-based social networks—having tens of millions of nodes connected by varying degrees of separation—it has become increasingly difficult to determine the relatedness between persons as represented by, say, determining the shortest path between two nodes. This is particularly problematic in situations where real-time computations are required or computational resources are limited or both.

SUMMARY

To facilitate the estimation of relatedness between nodes of a graph, implementations disclosed herein estimate relatedness between nodes in a graph by pre-computing for a subset of sample nodes (e.g., center nodes) a plurality of transition probabilities between each sample node and each of the other nodes in the graph. Later, when queried, the implementations calculate, in real-time, the resultant estimated transition probability between the first node and the second node through the at least one sample node based on the pre-computed transition probabilities.

For certain implementations, pre-computing an estimated relatedness in a graph comprises selecting a subset of sample nodes, pre-computing transition probabilities between each sample node in the subset of sample nodes and each other node, and storing the plurality of transition probabilities.

Similarly, for certain implementations, estimating relatedness between a first node and a second node in a graph wherein transition probabilities have been pre-computed and stored for the nodes in relation to a subset of sample nodes, comprises identifying at least one sample node that is common to both the first node and the second node such that the transition probabilities comprises both at least one individual transition probability between the at least one sample node and the first node and at least one individual transition probability between the at least one sample node and the second node, and calculating a resultant transition probability between the first node and the second node through the at least one sample node.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

To facilitate an understanding of and for the purpose of illustrating the present disclosure and various implementations, exemplary features and implementations are disclosed in, and are better understood when read in conjunction with, the accompanying drawings—it being understood, however, that the present disclosure is not limited to the specific methods, precise arrangements, and instrumentalities disclosed. Similar reference characters denote similar elements throughout the several views. In the drawings:

FIG. 2 is an operational flow diagram of an implementation of a method of pre-computing estimated relatedness in a graph and then calculating a resultant estimated relatedness between two nodes when later queried;

FIG. 3 is an operational flow diagram of an implementation of a method of pre-computing estimated relatedness for a graph;

FIG. 4 is an operational flow diagram of an implementation of a method for calculating a resultant estimated relatedness between two nodes using the pre-computed estimated relatedness;

DETAILED DESCRIPTION

Figure 1:
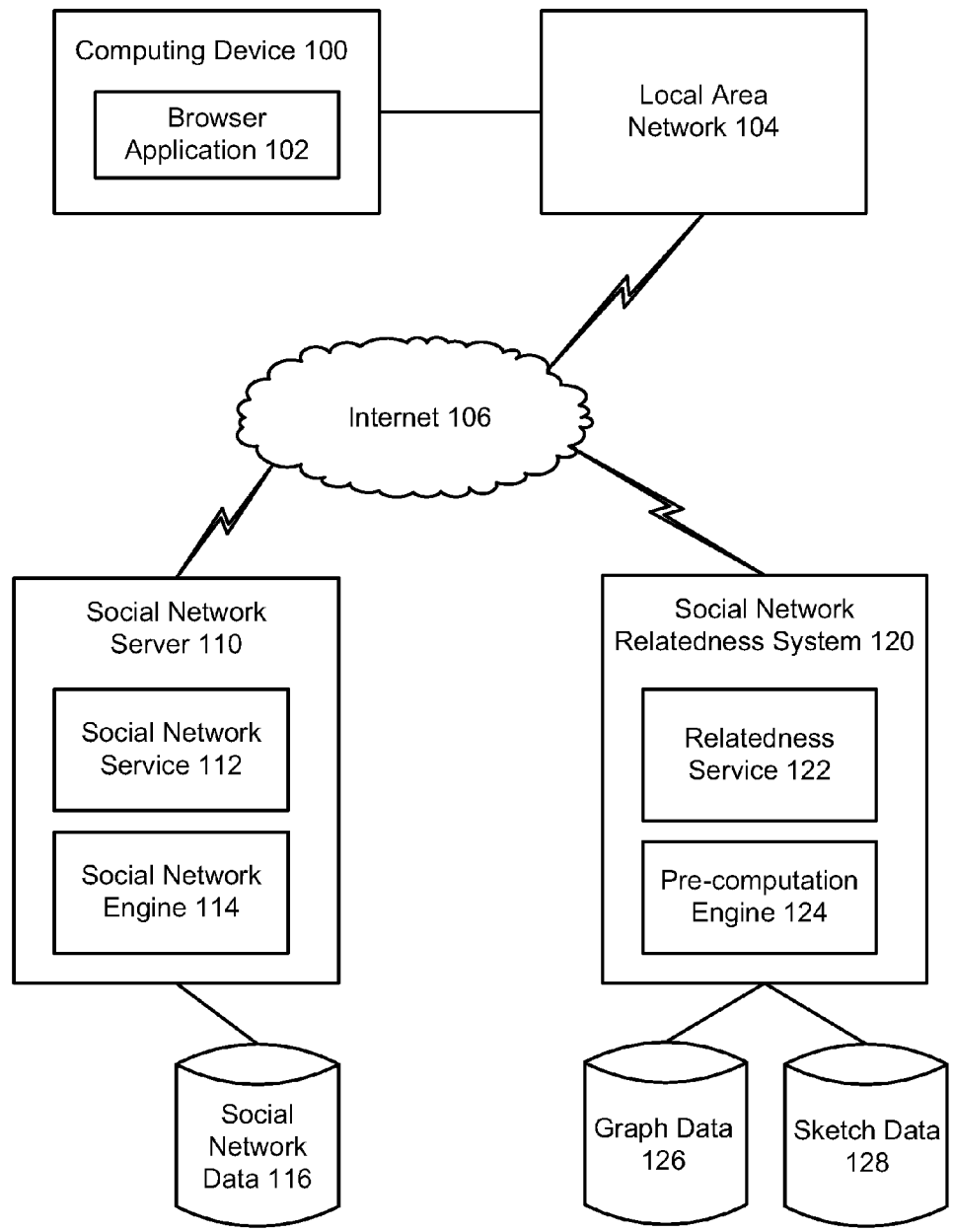
FIG. 1 shows an example of a computing environment in which aspects and implementations may be potentially exploited.

FIG. 1 shows an example of a computing environment in which aspects and embodiments may be potentially exploited. A computing device 100 includes a network interface card (not specifically shown) facilitating communications over a communications medium. The computing device 100 may communicate with a local area network 104 via a physical connection, for example. Alternatively, the computing device 100 may communicate with the local area network 104 via a wireless wide area network or a wireless local area network media, or via other communications media. The computing device 100 may be a general purpose computing device such as the computing device 600 described with respect to FIG. 6, for example.

A user of the computing device 100, as a result of the supported network medium, is able to access network resources typically through the use of a browser application 102 running on the computing device 100. The browser application 102 facilitates communication with a remote network over, for example, the Internet 106 which in turn may facilitate communication with a social network service 112 running on a social network server 110. The social network server 110 further comprises a social network engine 114 for establishing and expanding the number of relationships (edges) between members of the social network (nodes) where members and corresponding relationships are comprised within the social network data 116.

Another network resource and one exemplary implementation includes a relatedness service 122 running on a social network relatedness system 120. As described further below, in some implementations the relatedness service 122 may receive two nodes of a graph—represented by graph data 126 and corresponding to social network data 116—from the user of the computing device 100, and use sketch data 128—previously derived from the graph data 126 by a pre-computation engine 124—to estimate the random walk transition probability between the two nodes of the graph as a measure of relatedness between the two members of the social network corresponding to the nodes. This measure of relatedness may then be returned to the user at the computing device 100. The social network relatedness system 120 and/or the relatedness service 122 may be implemented using one or more general purpose computing devices such as the computing device 600 described with respect to FIG. 6, for example.

As described above, a graph may include one or more nodes or vertices connected to one another by one or more edges. Each edge may further have a weight that represents relatedness between the two nodes it directly connects. The total relatedness between two non-connected nodes traveling on a relationship path from one node to another node may be determined by adding the weights of each of the edges of the relationship path and is referred to herein as the relatedness between the two nodes. The path between two nodes with the lowest relatedness sum from the graph corresponds to the strongest relatedness between the two nodes.

A graph can be a directed graph or an undirected graph. In an undirected graph, edges between nodes are bi-directional and symmetrical, and thus correspond well to real-world abstractions like roadmaps. In a directed graph, however, edges between nodes are one-way and/or asymmetrical; thus, a directed graph is useful in representing real-world abstractions such as plumbing systems and links between webpages (which both represent one-way travel).

For a graph representing a social network, edges can be either directed or undirected depending on what is being measured; for example, a social network based on "who knows who" could be a directed graph since, for example, famous people may be known by ordinary people but not vice versa; in contrast, a social network based on strength of the relationship (which is presumably shared equally by both persons) might be better represented as an undirected graph. For directed graphs, the edges that lead to a node are referred to as the in-edges of the node. Similarly, the edges that lead out of the node (e.g., to other nodes) are referred to as the out-edges of the node. Because undirected graphs have two-way movement, the number of in-edges and out-edges for a node in an undirected graph is the same.

In some implementations, the social network relatedness system 120 may store one or more social networks as graph data 126. The graph data 126 may include a variety of directed and undirected graphs with each graph representing a variety of systems. In some implementations, the graph data 126 may be stored as a table with an entry for each node and a list of the edges associated with the node and their respective weights or costs. Where the graphs are directed, the direction of each edge may also be indicated. However, any data structure or technique for storing graphs may be used. In addition, metadata or other descriptive data may also be stored with the graph data 126.

To facilitate the estimation of relatedness between nodes of a graph, the social network relatedness system 120 may include a pre-computation engine 124. The pre-computation engine 124 may generate one or more sketches for each node of the graph data 126. As described further herein, in some implementations, a sketch may comprise a list, table, or other data structure that is associated with each node in the graph and includes indicators of some subset of the nodes of the graph along with known relatednesss between the node and the identified nodes in the subsets of the nodes. These generated sketches may be stored by the pre-computation engine 124 as the sketch data 128. In certain implementations, the sketch data 128 may be pre-computed by the pre-computation engine 124. The pre-computed sketches may be used by the relatedness service 122 to estimate the relatedness between two nodes of the graph. By pre-computing the sketch data 128, the relatedness service 122 may quickly respond to received queries using the pre-computed sketches.

FIG. 2 is an operational flow diagram of an implementation of a method 200 of pre-computing estimated relatedness in a graph and then calculating a resultant estimated relatedness between two nodes when later queried. Specifically, the method 200 comprises: (1) pre-computation and (2) real-time estimation. In one implementation, and as shown at 202 in FIG. 2, the aforementioned pre-computation engine 124 of FIG. 1 pre-computes transition probabilities for a set of center nodes with regard to the other nodes in the graph, and then stores the results with these other nodes for ready reference later when queried.

Then, when later queried to do so after the pre-computation is complete, and as shown at 204, the relatedness service 122 of FIG. 1 can calculate a resultant transition probability between two nodes in the query based on the transition probabilities pre-computed for the two nodes through the center nodes. These elements are discussed in further detail below.

FIG. 3 is an operational flow diagram of an implementation of a method 300 of pre-computing estimated relatedness for a graph. In this implementation, the pre-computation engine 124 first identifies a plurality of centers in the graph at 302 to serve as a sample subset of nodes for which a sketch of the graph will be developed. The centers (or "central nodes") of the graph are nodes having minimum eccentricity, that is, the set of all nodes where for each such node the greatest distance from it to its relatively farthest other node in the graph (using the most efficient path possible) is minimal. As such, these central points minimize the maximal distance from other points in the graph.

Generally, this sample subset is relatively small and in some implementations may comprise only the true central nodes while in other implementations may comprise only relatively central nodes where no nodes of greater centricity remain unselected for the sampling subset. Of course, in other implementations the sample subset could comprise a mix of centers and non-center nodes, or the sample subset could also comprise a random selection of nodes in yet other implementations.

At 304, the pre-computation engine 124 calculates transition probabilities from each center to every other node (including center and non-center nodes) in the graph. Certain embodiments may utilize a predetermined number of random walks to determine estimated transitional probabilities, while other embodiments may use a flexible number of random walks or another technique altogether for determining an estimated transitional probability.

Then, at 306, the pre-computation engine 124 stores each calculated transition probability as sketch data 128 in certain implementations or directly with each node in certain other implementations. When so stored with each node in the graph, each non-center node then has near at hand the transition probabilities from itself to each of the sample nodes (equal in number to the number of sampling nodes), while each of the sample nodes would also have transition probabilities from itself to each of the other sample nodes (equal in number to one less than the number of sampling nodes). In alternative embodiments, each non-center (or non-sample) node might only store a subset of transition probabilities provided to it, such as only those transition probabilities corresponding to 'near' or 'close' sample nodes. This may be relevant when determining a resulting transition probability between two query nodes.

After the pre-computation engine 124 has completed its work on a subject graph, the social network relatedness system 120 is then ready to receive and timely service queries for the relatedness between two nodes within the graph representing the social network. FIG. 4 is an operational flow diagram of an implementation of a method 400 for calculating a resultant estimated relatedness between two nodes using the pre-computed estimated relatedness. At 402, the relatedness service 122 receives a query for relatedness between two people in the social network (represented as a pair of input nodes in the graph as represented in graph data 126 corresponding to the social network data 116).

At 404, the relatedness service retrieves the calculated transition probabilities corresponding to both nodes from each of those nodes and then, at 406, determines the resultant estimated transition probability between the pair of nodes based on the retrieved pre-computed transition probabilities.

To calculate the resulting transition probability between two query nodes, one of several approaches might be used depending on the implementation. For example, for those implementations where each non-sample node stores all of the transition probabilities to each and every sample node, the resultant transition probability can be derived by normalizing the results of each path through each sample node. Similarly, for those other implementations that keep at least one more than half of the transition probabilities (corresponding to one more than half of the sample nodes), then each node will have at least one overlapping sampling node in common with every other node in the graph and thus will be able to derived at least one path through at least one sample node. And for those implementations where the nodes only maintain as little as one transition probability corresponding to a single "close" or "near" sample node, then the resulting transition probability can be determined using the transition probability for each query node to their corresponding sample node and, if the sample nodes are different, further utilizing the transition probability between the two sample nodes.

Figure 5:
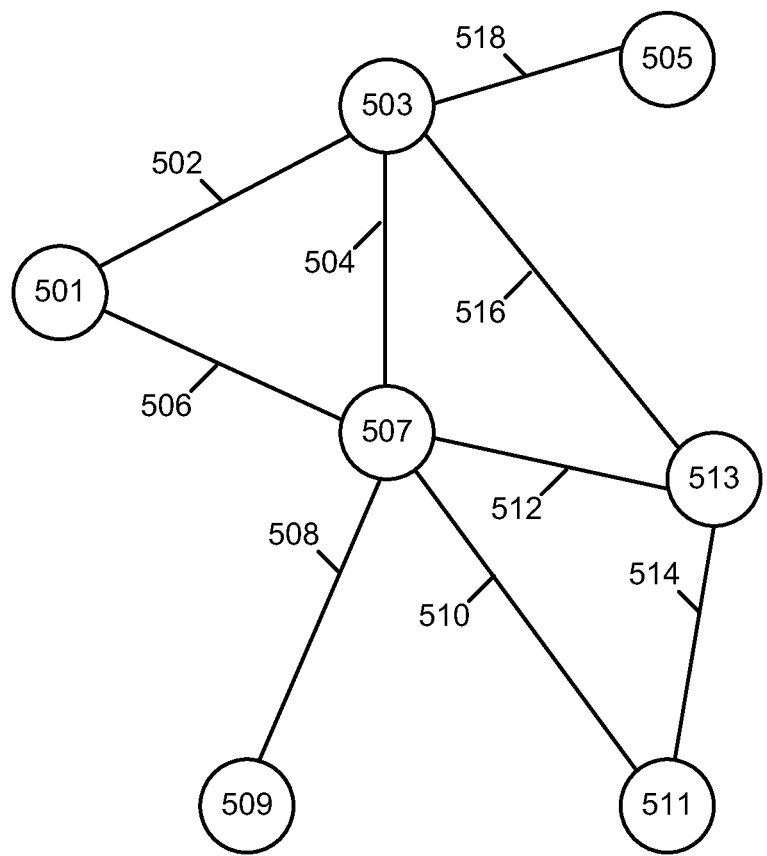
FIG. 5 is an illustration of a simple graph representing a social network.

FIG. 5 is an illustration of a simple graph 500 representing, for example, a social network. The graph 500 includes nodes 501, 503, 505, 507, 509, 511, and 513. Each node of the nodes 501-513 may represent a person or member in a social network. The graph 500 further includes one or more edges 502, 504, 506, 508, 510, 512, 514, 516, and 518. Each of the edges 502-518 from one of nodes 501-513 may represent the relatedness between persons or members in the social network. While the graph 500 is shown having only seven nodes and nine edges, it is for illustrative purposes only. There is no limit to the number of nodes that may be supported and may include millions of nodes for large social networks.

In a random walk of length l through the graph 500, a random walk of length four starting from the node 501 may travel to node 503 by following edge 502, may then travel to node 507 by following edge 504, may then travel to node 513 by following edge 512, and may then travel to node 511 by following edge 513. In some implementations, the particular edge selected to follow in a random walk may be pseudo-randomly selected. For example, at node 501 whether to follow edge 502 or edge 506 may be decided by using a pseudo-random algorithm with an approximately 50% chance of choosing either edge 502 or edge 506. At node 507 whether to follow edge 508, 510, or 512 may be decided by a pseudo-random algorithm with an approximately 33% chance of choosing any of edges 508, 510, or 512. Any known method or technique for making pseudo-random selections may be used in alternate implementations herein described.

Figure 6:
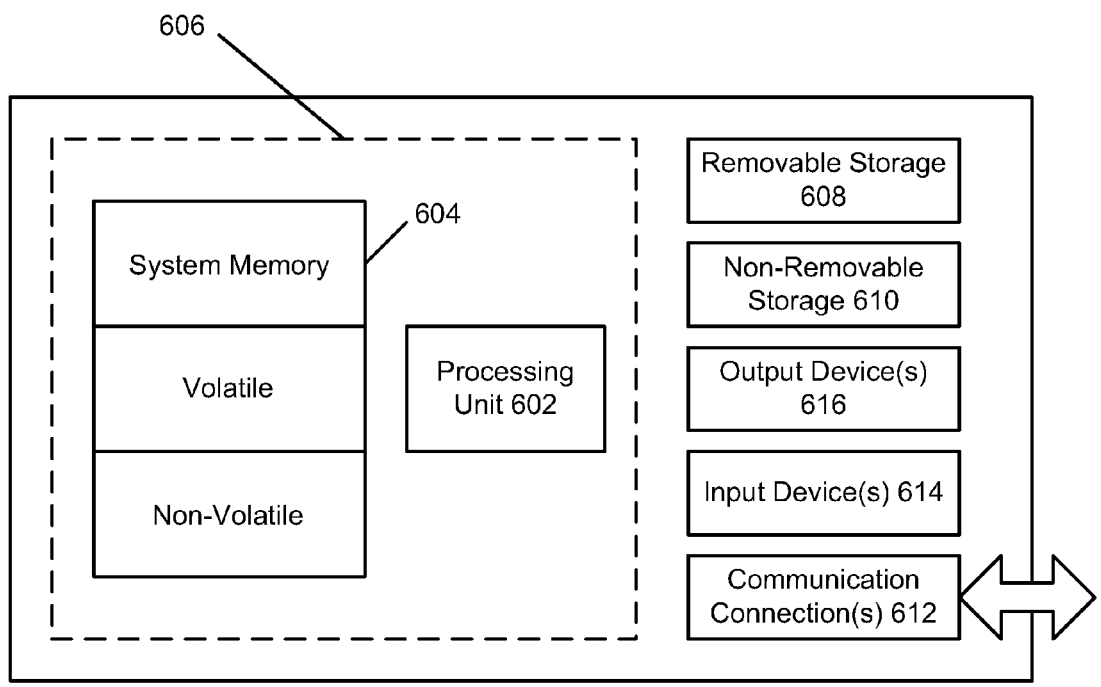
FIG. 6 shows an exemplary computing environment.

FIG. 6 shows an exemplary computing environment in which example implementations and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an exemplary system for implementing aspects described herein includes a computing device, such as computing device 600. In its most basic configuration, computing device 600 typically includes at least one processing unit 602 and memory 604. Depending on the exact configuration and type of computing device, memory 604 may be volatile (such as random access memory (RAM)), non-volatile (such as read-only memory (ROM), flash memory, etc.), or some combination of the two. This most basic configuration is illustrated in FIG. 6 by dashed line 606.

Computing device 600 may have additional features/functionality. For example, computing device 600 may include additional storage (removable and/or non-removable) including, but not limited to, magnetic or optical disks or tape. Such additional storage is illustrated in FIG. 6 by removable storage 608 and non-removable storage 610.

Computing device 600 typically includes a variety of computer readable media. Computer readable media can be any available media that can be accessed by device 600 and include both volatile and non-volatile media, and removable and non-removable media.

Computer storage media include volatile and non-volatile, and removable and non-removable media implemented in any method or technology for storage of information such as computer readable instructions, data structures, program modules or other data. Memory 604, removable storage 608, and non-removable storage 610 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of computing device 600.

Computing device 600 may contain communications connection(s) 612 that allow the device to communicate with other devices. Computing device 600 may also have input device(s) 614 such as a keyboard, mouse, pen, voice input device, touch input device, etc. Output device(s) 616 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the processes and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include PCs, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for determining an estimated relatedness between a first node and a second node in a graph comprising a plurality of nodes and a plurality of edges, the method comprising:
    selecting a subset of sample nodes comprising at least one node from among the plurality of nodes;
    determining a plurality of transition probabilities between each sample node in the subset of sample nodes and each other node comprising the plurality of nodes;
    storing the plurality of transition probabilities; and
    determining a resultant transition probability between the first node and the second node through at least one sample node based on the plurality of transition probabilities.

2. The method of claim 1, wherein the subset of sample nodes is randomly selected.

3. The method of claim 1, wherein the subset of sample nodes comprises at least one center node.

4. The method of claim 3, wherein the subset of sample nodes comprise only relatively central nodes.

5. The method of claim 1, wherein determining the plurality of transition probabilities between each sample node in the subset of sample nodes and each other node comprising the plurality of nodes further comprises conducting a predetermined number of random walks between each sample node and each other node.

6. The method of claim 1, wherein storing the plurality of transition probabilities comprises storing each of an individual transition probability from among the plurality of transition probabilities with the other node corresponding to that individual transition probability.

7. The method of claim 6, further comprising, for at least one node, storing less than all of the individual transition probabilities corresponding to the at least one node.

8. The method of claim 7, wherein each node from among the plurality of nodes stores at least one more than half of all of the individual transition probabilities corresponding to the node.

9. The method of claim 8, wherein each node from among the plurality of nodes stores at least one individual transition probability corresponding to a nearby sample node from among the set of sample nodes.

10. A method of estimating relatedness between a first node and a second node in a graph comprising a plurality of nodes and a plurality of edges associated with the plurality of nodes, wherein a plurality of transition probabilities have been pre-computed and stored for the plurality of nodes in relation to a subset of sample nodes selected from the plurality of nodes, the method comprising:
    identifying at least one sample node from among the subset of sample nodes that is common to both the first node and the second node such that the plurality of transition probabilities comprises both at least one individual transition probability between the at least one sample node and the first node and at least one individual transition probability between the at least one sample node and the second node; and
    determining a resultant transition probability between the first node and the second node through the at least one sample node.

11. The method of claim 10, wherein determining the resultant transition probability between the first node and the second node through the at least one sample node comprises determining the sum of the individual transition probability from the first node to the at least one sample node and the individual transition probability from the second node to the at least one sample node.

12. The method of claim 10, wherein at least one first individual transition probability from among the plurality of transition probabilities and corresponding to the first node are stored with the first node, wherein at least one second individual transition probability from among the plurality of transition probabilities corresponding to the second node are stored with the second node, and wherein identifying the at least one sample node from among the subset of sample nodes that is common to both the first node and the second node comprises comparing the at least one first individual transition probability with the at least one second individual transition probability.

13. The method of claim 10, wherein the at least one sample node comprises a plurality of sample nodes, and further comprising:

calculating a plurality of resultant transition probabilities between the first node and the second node through a plurality of sample nodes; and normalizing the calculated plurality of resultant transition probabilities to derive a resultant transition probability.

14. The method of claim 10, wherein each node from among the plurality of nodes stores at least one individual transition probability corresponding to a nearby sample node from among the set of sample nodes, and wherein each sample node from among the plurality of sample nodes stores at least one individual transition probability for each of the other sample nodes among the plurality of sample nodes, the method further comprising:

identifying a first individual transition probability for the first node corresponding to a first sample node, identifying a second individual transition probability for the second node corresponding to a second sample node, and identifying a third individual transition probability for the first sample node corresponding to the second sample node; and wherein calculating a resultant transition probability between the first node and the second node is based on the first, second, and third individual transition probabilities.

15. The method of claim 14, wherein determining the resultant transition probability between the first node and the second node through the first and second sample nodes comprises determining the sum of the first, second, and third individual transition probabilities.

16. A method of estimating relatedness between a first node and a second node in a graph comprising a plurality of nodes and a plurality of edges associated with the plurality of nodes, the method comprising:

determining for a subset of sample nodes a plurality of transition probabilities between each sample node in the subset of sample nodes and each other node comprising the plurality of nodes; and when queried, calculating a resultant transition probability between the first node and the second node through at least one sample node based on the plurality of transition probabilities.

17. The method of claim 16, further comprising:

selecting the subset of sample nodes comprising at least one node from among the plurality of nodes such that the subset of sample nodes comprises only relatively central nodes.

18. The method of claim 16, further comprising:

storing the plurality of transition probabilities such that each of an individual transition probability from among the plurality of transition probabilities is stored with the other node corresponding to that individual transition probability.

19. The method of claim 16, wherein determining the plurality of transition probabilities between each sample node in the subset of sample nodes and every other node comprising the plurality of nodes further comprises conducting a predetermined number of random walks between each sample node and each other node.

20. The method of claim 16, wherein at least one first individual transition probability from among the plurality of transition probabilities and corresponding to the first node are stored with the first node, wherein at least one second individual transition probability from among the plurality of transition probabilities corresponding to the second node are stored with the second node, and further comprising identifying at least one sample node from among the subset of sample nodes that is common to both the first node and the second node b comparing the at least one first individual transition probability with the at least one second individual transition probability.

* * * * *